(12) United States Patent
Lin et al.

(10) Patent No.: US 11,765,349 B2
(45) Date of Patent: Sep. 19, 2023

(54) METHOD AND APPARATUS OF IN-LOOP FILTERING FOR VIRTUAL BOUNDARIES

(71) Applicant: MEDIATEK INC., Hsinchu (TW)

(72) Inventors: Sheng Yen Lin, Hsinchu (TW); Lin Liu, Beijing (CN); Jian-Liang Lin, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 16/557,686

(22) Filed: Aug. 30, 2019

(65) Prior Publication Data

US 2020/0077092 A1 Mar. 5, 2020

Related U.S. Application Data

(60) Provisional application No. 62/792,489, filed on Jan. 15, 2019, provisional application No. 62/791,963, (Continued)

(30) Foreign Application Priority Data

Aug. 30, 2019 (WO) ................ PCT/CN2019/103705

(51) Int. Cl.
*H04N 19/117* (2014.01)
*H04N 19/172* (2014.01)
(Continued)

(52) U.S. Cl.
CPC ......... *H04N 19/117* (2014.11); *H04N 19/172* (2014.11); *H04N 19/61* (2014.11); *H04N 19/70* (2014.11)

(58) Field of Classification Search
CPC .... H04N 19/176; H04N 19/117; H04N 19/82; H04N 19/105; H04N 19/119; H04N 19/172; H04N 19/597; H04N 19/157
See application file for complete search history.

(56) References Cited

U.S. PATENT DOCUMENTS

| 10,404,979 B2 | 9/2019 | Liu et al. |
| 10,694,184 B2 | 6/2020 | Ahn et al. |
| (Continued) | | |

FOREIGN PATENT DOCUMENTS

| CN | 103503456 A | 1/2014 |
| CN | 104702963 A | 6/2015 |
| (Continued) | | |

OTHER PUBLICATIONS

Non-Final Office Action dated Oct. 6, 2020, issued in U.S. Appl. No. 16/737,377.

(Continued)

*Primary Examiner* — Farhan Mahmud
(74) *Attorney, Agent, or Firm* — McClure, Qualey & Rodack, LLP

(57) ABSTRACT

Method and apparatus of coding pictures containing one or more virtual boundaries, such as 360-degree virtual reality (VR360) video are disclosed. According to this method, a reconstructed filtered unit associated with a loop filter for a current reconstructed pixel is received. The loop filtering process associated with the loop filter is applied to the current reconstructed pixel to generate a filtered reconstructed pixel, where if the loop filtering process for the current reconstructed pixel is across a virtual boundary of the picture, the loop filtering process is disabled when fixed-size loop filtering is used or a smaller-size loop filter is selected when adaptive-size loop filtering is used for the current reconstructed pixel, where the filtered reconstructed pixel is the same as the current reconstructed pixel when the loop filtering process is disabled. The filtered reconstructed pixel is the same as the current reconstructed pixel.

11 Claims, 7 Drawing Sheets

Related U.S. Application Data filed on Jan. 14, 2019, provisional application No. 62/725,307, filed on Aug. 31, 2018.

(51) Int. Cl.
*H04N 19/70* (2014.01)
*H04N 19/61* (2014.01)

(56) References Cited

U.S. PATENT DOCUMENTS

| | | |
|---|---|---|
| 2010/0238160 A1 | 9/2010 | Yea et al. |
| 2013/0044809 A1 | 2/2013 | Chong et al. |
| 2013/0272624 A1 | 10/2013 | Budagavi |
| 2013/0272626 A1 | 10/2013 | Robinson |
| 2013/0322523 A1 | 12/2013 | Huang et al. |
| 2013/0343447 A1 | 12/2013 | Chen et al. |
| 2017/0214937 A1 | 7/2017 | Lin et al. |
| 2017/0272758 A1 | 9/2017 | Lin et al. |
| 2017/0332107 A1 | 11/2017 | Abbas et al. |
| 2018/0054613 A1 | 2/2018 | Lin et al. |
| 2019/0007684 A1* | 1/2019 | Van der Auwera ....... G06T 9/40 |
| 2019/0045224 A1 | 2/2019 | Huang et al. |
| 2019/0089961 A1* | 3/2019 | Ahn .................... H04N 19/159 |
| 2019/0215532 A1 | 7/2019 | He et al. |
| 2019/0253734 A1 | 8/2019 | Lee et al. |
| 2020/0120359 A1 | 4/2020 | Hanhart et al. |
| 2020/0145663 A1* | 5/2020 | Li ........................ H04N 19/91 |
| 2020/0304787 A1 | 9/2020 | Budagavi |
| 2020/0396461 A1 | 12/2020 | Zhao et al. |

FOREIGN PATENT DOCUMENTS

| | | |
|---|---|---|
| CN | 105141948 A | 12/2015 |
| CN | 107040778 A | 8/2017 |
| CN | 107155109 A | 9/2017 |
| CN | 104702963 B | 11/2017 |
| CN | 108605143 A | 9/2018 |
| CN | 108632609 A | 10/2018 |
| CN | 108632619 A | 10/2018 |
| CN | 109155857 A | 1/2019 |
| WO | 2017/133660 A1 | 8/2017 |
| WO | 2018/036447 A1 | 3/2018 |
| WO | 2018/182377 A1 | 10/2018 |

OTHER PUBLICATIONS

Chinese language office action dated Aug. 27, 2020, issued in application No. TW 108131376.
Bross, B., et al.; "Versatile Video Coding (Draft 3);" Joint Video Experts Team (JVET) of ITU-T SG 16 WP 3 and ISO/IEC JTC 1/SC 29/WG 11; Oct. 2018; pp. 1-236.
European Search Report dated Jun. 1, 2021, issued in application No. EP 19854497.5.
European Search Report dated Jun. 7, 2021, issued in application No. EP 19856135.9.
Chen, C.Y., et al.; "CE8.c.3: Multi-source SAO and ALF virtual boundary processing;" Joint Collaborative Team on Video Coding (JCT-VC) of ITU-T SG16 WP3 and ISO/IEC JTC1/SC29/WG11; Nov. 2011; pp. 1-11.
Lin, S.Y., et al.; "CE-13 related: Loop filter disabled across virtual boundaries;" Joint Video Experts Team (JVET) of ITU-T SG 16 WP 3 and ISO/IEC JTC 1/SC 29/WG 11; Jan. 2019; pp. 1-17.
Chinese language office action dated Apr. 7, 2023, issued in application No. CN 201980080983.5.

* cited by examiner

METHOD AND APPARATUS OF IN-LOOP FILTERING FOR VIRTUAL BOUNDARIES

CROSS REFERENCE TO RELATED APPLICATIONS

The present invention claims priority to U.S. Provisional Patent Application Ser. No. 62/725,307, filed on Aug. 31, 2018, U.S. Provisional Patent Application Ser. No. 62/791,963, filed on Jan. 14, 2019 and U.S. Provisional Patent Application Ser. No. 62/792,489, filed on Jan. 15, 2019. The U.S. Provisional Patent Applications are hereby incorporated by reference in their entireties.

FIELD OF THE INVENTION

The present invention relates to picture processing for pictures containing one or more virtual boundaries such as 360-degree virtual reality (VR360) pictures. In particular, the present invention relates to in-loop filtering process at discontinued edges or virtual boundaries for pictures containing one or more virtual boundaries such as VR360 video coding.

BACKGROUND AND RELATED ART

The 360-degree video, also known as immersive video is an emerging technology, which can provide "feeling as sensation of present". The sense of immersion is achieved by surrounding a user with wrap-around scene covering a panoramic view, in particular, 360-degree field of view. The "feeling as sensation of present" can be further improved by stereographic rendering. Accordingly, the panoramic video is being widely used in Virtual Reality (VR) applications.

The 360-degree virtual reality (VR) pictures may be captured using a 360-degree spherical panoramic camera or multiple pictures arranged to cover all field of views around 360 degrees. The three-dimensional (3D) spherical picture is difficult to process or store using the conventional picture/video processing devices. Therefore, the 360-degree VR pictures are often converted to a two-dimensional (2D) format using a 3D-to-2D projection method, such as EquiRectangular Projection (ERP) and CubeMap Projection (CMP). Besides the ERP and CMP projection formats, there are various other VR projection formats, such as OctaHedron Projection (OHP), icosahedron projection (ISP), Segmented Sphere Projection (SSP) and Rotated Sphere Projection (RSP) that are widely used in the field.

The VR360 video sequence usually requires more storage space than the conventional 2D video sequence. Therefore, video compression is often applied to VR360 video sequence to reduce the storage space for storage or the bit rate for streaming/transmission.

The High Efficiency Video Coding (HEVC) standard is developed under the joint video project of the ITU-T Video Coding Experts Group (VCEG) and the ISO/IEC Moving Picture Experts Group (MPEG) standardization organizations, and is especially with partnership known as the Joint Collaborative Team on Video Coding (JCT-VC). VR360 video sequences can be coded using HEVC. However, the present invention may also be applicable for other coding methods.

In HEVC, one slice is partitioned into multiple coding tree units (CTU). For colour pictures, a colour slice may be a partitioned into multiple coding tree blocks (CTB). The CTU is further partitioned into multiple coding units (CUs) to adapt to various local characteristics. HEVC supports multiple Intra prediction modes and for Intra coded CU, the selected Intra prediction mode is signalled. In addition to the concept of coding unit, the concept of prediction unit (PU) is also introduced in HEVC. Once the splitting of CU hierarchical tree is done, each leaf CU is further split into one or more prediction units (PUs) according to prediction type and PU partition. After prediction, the residues associated with the CU are partitioned into transform blocks, named transform units (TUs) for the transform process.

While the coding process can effectively reduce required bandwidth for transmission or required capacity for storage, the coding process often introduces coding noise referred as coding artefacts. In order to alleviate the coding artefact, various filtering techniques, such as de-blocking filter, SAO (sample adaptive offset) and ALF (adaptive loop filter), have been introduced. The filtering process is often applied to reconstructed pictures that are later used as reference pictures. In other words, the filtering process is inside the coding loop. Accordingly, such filtering process is also referred as in-loop filtering.

In HEVC, de-blocking filter is applied after the picture is reconstructed. The boundaries between coding units, prediction units or transform units are filtered to alleviate the blocking artefacts caused by the block-based coding. The boundary can be a vertical or horizontal boundary. The boundary pixels involved in de-blocking filtering process for the vertical boundary (110) and horizontal boundary (120) as shown in FIG. 1A and FIG. 1B respectively. For a vertical boundary (i.e., line 110 in FIG. 1A), a horizontal filter is applied to some boundary samples in each horizontal line. For example, the horizontal de-blocking filter may be applied to p00, p01 and p02 on the left side of the vertical boundary and q00, q01 and q02 on the right side of the vertical boundary. Similarly, for a horizontal boundary (i.e., line 120 in FIG. 1B), a vertical filter is applied to some boundary samples in each vertical line. For example, the vertical de-blocking filter may be applied to p00, p01 and p02 on the top side of the horizontal boundary and q00, q01 and q02 on the bottom side of the horizontal boundary. In other words, the de-blocking filter is applied in a direction perpendicular to the boundary.

A boundary strength value, Bs is calculated for each four-sample length boundary and can take 3 possible values. Luma and chroma components are processed separately in the de-blocking process. For the Luma component, only block boundaries with Bs values equal to 1 or 2 can be filtered. In the case of chroma components, only boundaries with Bs value equal to 2 can be filtered.

For luma component, additional conditions are checked for each four-sample length boundary to determine whether de-blocking filtering should be applied and to further determine whether a normal filter or a strong filter should be applied if de-blocking is applied.

For the luma component in the normal filtering mode, two samples at each side of the boundary can be modified. In the strong filtering mode, three samples at each side of the boundary can be modified.

For the chroma component, only one sample at each side of the boundary can be modified when the boundary strength is greater than 1.

SAO processing is developed to compensate intensity level offset caused by the coding process. SAO processing adopted by HEVC consists of two methods. One is Band Offset (BO), and the other is Edge Offset (EO). BO is used to classify pixels into multiple bands according to pixel intensities and an offset is applied to pixels in one or more bands. EO is used to classify pixels into categories according to relations between a current pixel and respective neighbours and an offset is applied to pixels in each category. There are 4 EO directional patterns (0°, 90°, 135°, and 45°) and no processing (OFF). The four EO types are shown in FIG. 2.

Upon classification of all pixels in a region, one offset is derived and transmitted for pixels in each category. SAO processing is applied to luma and chroma components, and each of the components is independently processed. One offset is derived for all pixels of each category except for category 4 of EO, where Category 4 is forced to use zero offset. Table 1 below lists the EO pixel classification, where "C" denotes the pixel to be classified. As shown in Table 1, the conditions associated with determining a category are related to comparing the current pixel value with two respective neighbour values according to the EO type. The category can be determined according to the comparison results (i.e., ">", "<" or "="). Each category has a special meaning in relative intensity between the current pixel and neighbouring pixels. For example, category 0 corresponds to a "valley", where the intensity of the centre pixel is lower than two neighbouring pixels. Category 3 corresponds to a "peak", where the intensity of the centre pixel is higher than two neighbouring pixels. Categories 1 and 2 correspond to a flat segment with an upward slope (Category 2) or a downward slope (Category 1).

TABLE 1

| Category | Condition |
| --- | --- |
| 0 | C < two neighbours |
| 1 | C < one neighbour && C == one neighbour |
| 2 | C > one neighbour && C == one neighbour |
| 3 | C > two neighbours |
| 4 | None of the above |

Adaptive Loop Filter (ALF) is a filter with adaptive filter size applied to the reconstructed pixels. ALF was evaluated during the HEVC standard development, but not adopted for HEVC. However, ALF is being considered by the emerging video coding standard, named VVC (Versatile Video Coding). To optimize the performance, ALF uses Wiener filtering techniques to derive filter coefficients. Furthermore, multiple filters are allowed for different picture regions. For example, the ALF can be a 5×5 filter or a 7×7 filter as shown in FIG. 3, where "C" indicates a current reconstructed pixel being filtered.

According to a conventional approach, the loop filters such as de-blocking, SAO and ALF will be applied to a reconstructed VR360 picture without considering the possible discontinued edges within the VR360 picture. For example, the cubemap based projection uses six faces on a cube to represent one frame in the VR360 video. The six faces corresponds to faces lifted off from the cube and fitted into different layouts, such as 1×6, 6×1, 2×3 or 3×2 layout. Among various cubemap layouts, the 3×2 layout is often used due to its coding efficiency. FIG. 4 illustrates an example of 3×2 cubemap layout formation. The layout 410 corresponds to six faces lifted off from a cube, where image 412 corresponds to a front face, the three images 414 connected to the left of image 412 correspond to the other three faces connected to the front face 412 in the horizontal direction, image 416 corresponds to the face on the top of the cube and image 418 corresponds to the face on the bottom of the cube. Accordingly, the fours images including images 414 and image 412 are continuous in the horizontal direction and the three images includes image 416, image 412 and image 418 are continuous in the vertical direction. The 4×3 layout 410 contains some blank areas, which is not efficient for coding. The layout 420 corresponds to a 3×2 cubemap layout, where the three images 414 and the three vertically connected images (images 416, 412 and 418) are abutted. The top sub-frame corresponding to the three images 414 are continuous in the horizontal direction. Also, the bottom sub-frame corresponding to the three images 412, 416 and 418 are continuous in the horizontal direction. However, the edges 422 between the top sub-frame and the bottom sub-frame is discontinuous. In other words, a VR360 picture corresponding to a layout format from a 3D projection may contain discontinuous edge within the picture.

Besides the VR360 pictures, other picture formats may also contain discontinuous edges within the picture. For example, the Picture-In-Picture (PIP) format is a popular format to display two videos (e.g. a main video and a sub-video) on the same screen simultaneously. Therefore, for each PIP frame, discontinuity may exist between the pictures associated with the two videos. The issues of loop filtering process across the discontinuous edge exist in the VR360 pictures as well as the PIP frames.

FIG. 5A to FIG. 5C illustrate examples of in-loop filters applied to a reconstructed VR360 picture. FIG. 5A illustrates an example of de-blocking filter, where the de-blocking filter is applied to a current block 510. The de-blocking filter is applied to the horizontal boundary 516 between the current block 510 and the neighbouring block 512 above. The de-blocking filter is also applied to the vertical boundary 518 between the current block 510 and the neighbouring block 514 on the left.

FIG. 5B illustrates an example of SAO processing. The offset compensation parameters are derived based on the statistics of each coding tree unit (CTU) 520. During the statistic derivation, the BO and EO classification is applied to all pixels. For each BO and EO category, an offset value is determined. After the statistics for the CTU are collected, the SAO can be applied to reconstructed pixels in the CTU.

FIG. 5C illustrates an example of ALF process for a reconstructed VR360 picture. A reconstructed pixel 530 may be filtered by a 5×5 filter or a reconstructed pixel 532 may be filtered by a 7×7 filter. As mentioned before, the filter parameters may be designed using Wiener filter technique to minimize the error between the original picture and the reconstructed picture. For each reconstructed pixel, the filter size is adaptively selected to achieve the best performance.

As illustrated in layout 420 in FIG. 4, the 3×2 layout for cubemap contains a discontinuous edge between the top sub-frame and the bottom sub-frame. The pixels on one side of the boundary 422 may be quite different from the pixels on the other side of the boundary 422. Therefore, when an in-loop filter is applied to reconstructed pixels next to the boundary or close to the boundary, it may cause undesirable result. FIG. 6 illustrates an example of SAO filter applied to a reconstructed pixel 622, where the discontinuous edge 610 is indicated. SAO operation 620 at the discontinuous edge is illustrated for the reconstructed pixel 622. The 3×3 SAO window is indicated by the dash-lined box 624. For the horizontal boundary 610, the SAO filtering process for 90°, 135°, and 45° will utilise a reference pixel from the other side of the discontinuous boundary. The neighbouring pixels 626 on the other side of discontinuous edge (named unexpected pixels) may be very different from the reconstructed pixel 622 being filtered though they are close to the reconstructed pixel 622. In this case, the SAO processing for the boundary pixels may produce undesirable results.

Therefore, it is desirable to develop techniques to overcome the issues related to in-loop filter for VR360 pictures.

BRIEF SUMMARY OF THE INVENTION

Method and apparatus of coding a video sequence are disclosed, wherein the reconstructed filtered unit comprises a plurality of reconstructed pixels for loop filtering process. According to this method, a reconstructed filtered unit for a current reconstructed pixel in a current picture is received, where the reconstructed filtered unit is associated with a loop filter and the reconstructed filtered unit comprises first reconstructed pixels for applying a loop filtering process associated with the loop filter to the current reconstructed pixel. The loop filtering process associated with the loop filter is applied to the current reconstructed pixel to generate a filtered reconstructed pixel, where if the loop filtering process for the current reconstructed pixel is across a virtual boundary of the current picture, the loop filtering process is disabled when fixed-size loop filtering is used or a smaller-size loop filter is selected when adaptive-size loop filtering is used for the current reconstructed pixel. The filtered reconstructed pixel is the same as the current reconstructed pixel when the loop filtering process is disabled. A processed picture comprising the filtered reconstructed pixel is provided. The loop filter belongs to a group comprising de-blocking filter, SAO (Sample Adaptive Offset) and ALF (Adaptive Loop Filter).

The video sequence may correspond to a 360-degree virtual reality (VR360) video.

In one embodiment, the loop filter corresponds to a de-blocking filter and the loop filtering process is disabled for a target block if a block edge associated with the target block for the de-blocking filter is aligned with the virtual boundary. In another embodiment, the loop filter corresponds to a de-blocking filter and the loop filtering process is disabled for a target block if the virtual boundary cross the target block. In yet another embodiment, the loop filter corresponds to a de-blocking filter and the loop filtering process is disabled for a target block if the virtual boundary cross a neighbouring block of the target block, and wherein the loop filtering process is applied to a block boundary between the target block and the neighbouring block of the target block.

In another embodiment, when the loop filter uses adaptive filter size, any loop filter candidate across the virtual boundary is removed and the loop filtering process is disabled if no remaining loop filter candidate is available. When the loop filter uses adaptive filter size and the loop filtering process is applied to the current reconstructed pixel, a selected filter is determined and a syntax in a bitstream to indicate the selected filter is transmitted.

In another embodiment, when the loop filter uses adaptive filter size, a loop filter candidate is determined and whether the loop filtering process associated with the loop filter candidate is across the virtual boundary is checked; if the loop filtering process associated with the loop filter candidate is across the virtual boundary, whether a smaller loop filter candidate exists is checked; and if no smaller loop filter candidate is available, the loop filtering process is disabled. If the smaller loop filter candidate exists, the smaller loop filter candidate is used as the loop filter candidate and whether the loop filtering process associated with the loop filter candidate is across the virtual boundary is checked.

In another embodiment, when the VR360 picture is in a 3×2 layout of cubemap-based projection, results of boundary checking derived for a target filtered unit in a row of filtered units are shared by other filtered units in the row of filtered units, and wherein the boundary checking determines whether the loop filtering process for the target filtered unit is across the virtual boundary between a top sub-frame and a bottom sub-frame of the VR360 picture.

DETAILED DESCRIPTION OF THE INVENTION

Figure 1A:
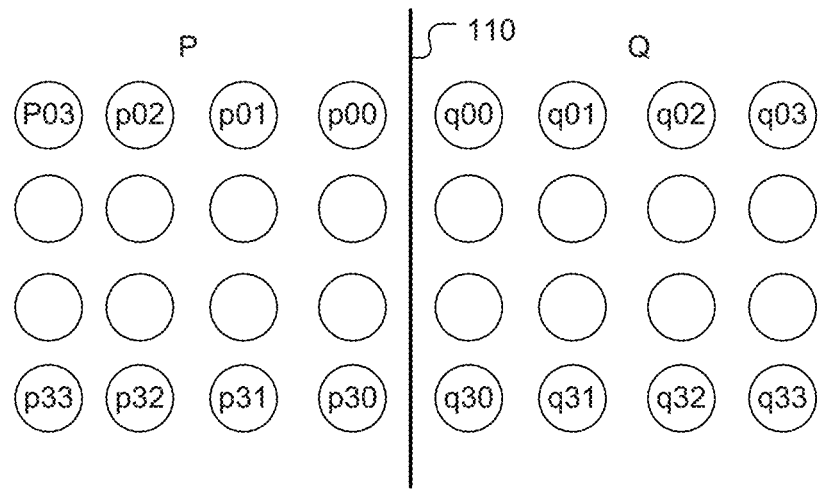
FIG. 1A illustrates an example of the boundary pixels involved in de-blocking filtering process for the vertical boundary.
Figure 1B:
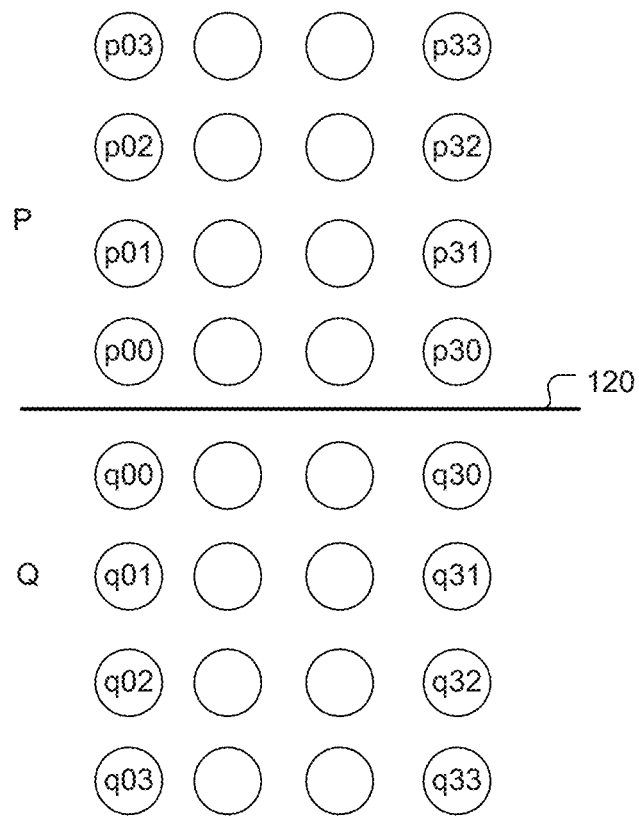
FIG. 1B illustrates an example of the boundary pixels involved in de-blocking filtering process for the horizontal boundary.
Figure 2:
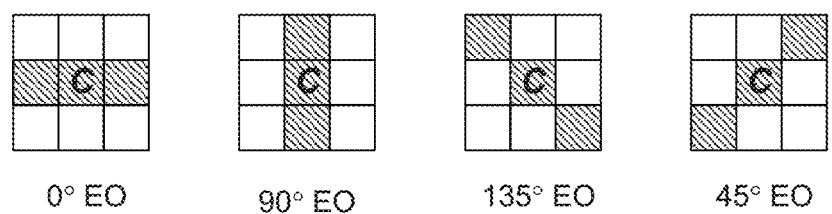
FIG. 2 shows the 4 EO (Edge Offset) directional patterns (0°, 90°, 135°, and 45°) for SAO (Sample Adaptive Offset).
Figure 3:
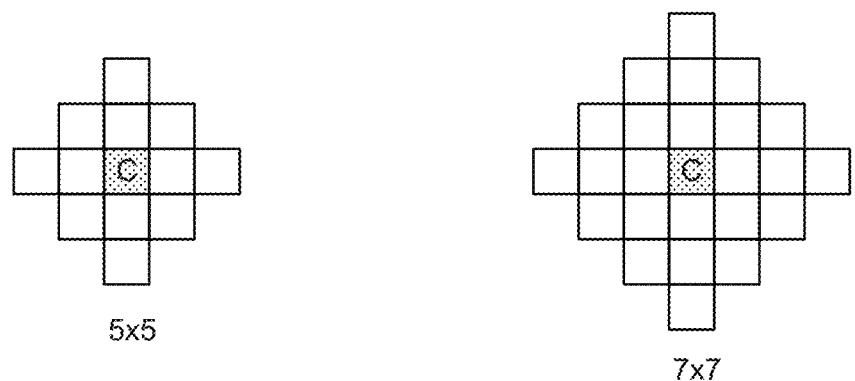
FIG. 3 illustrates an example of the ALF comprising a 5×5 filter and a 7×7 filter, where "C" indicates a current reconstructed pixel being filtered.
Figure 4:
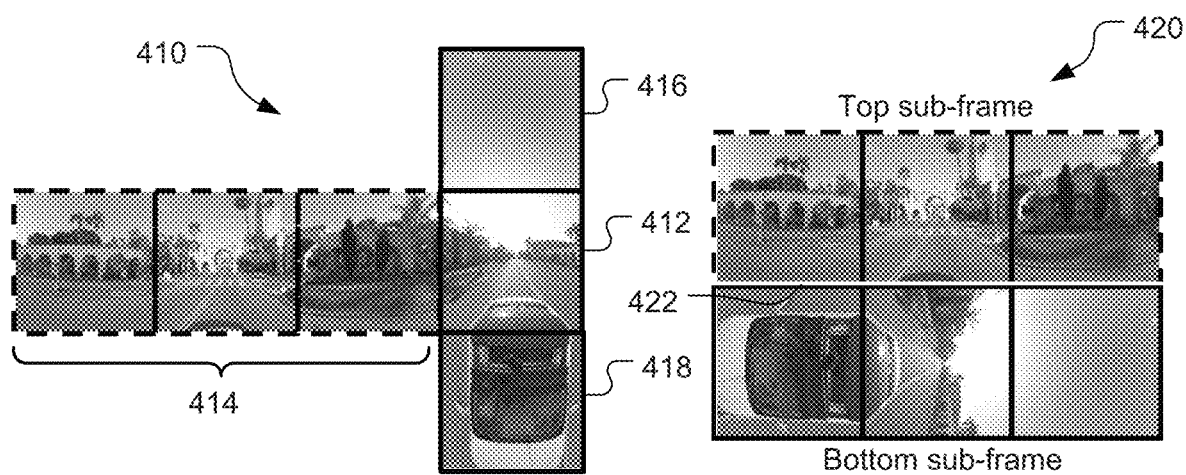
FIG. 4 illustrates an example of 4×3 and 3×2 cubemap layout formations.
Figure 5A:
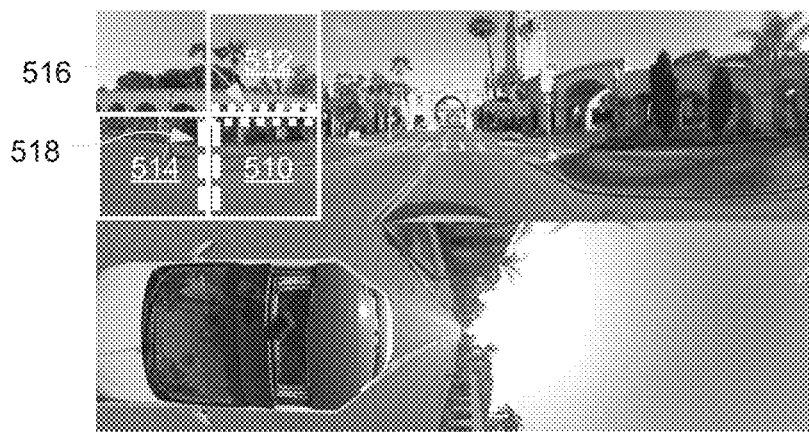
FIG. 5A illustrates an example of de-blocking filter applied to a block of a VR360 picture in the 3×2 layout.
Figure 5B:
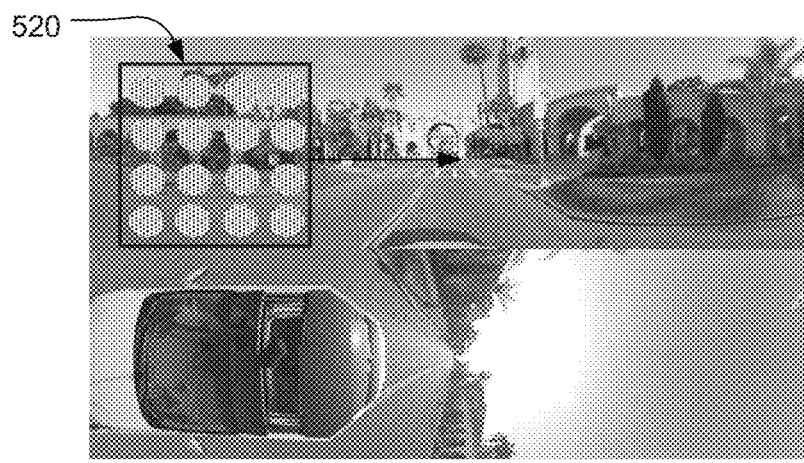
FIG. 5B illustrates an example of SAO processing applied to pixels of a VR360 picture in the 3×2 layout.
Figure 5C:
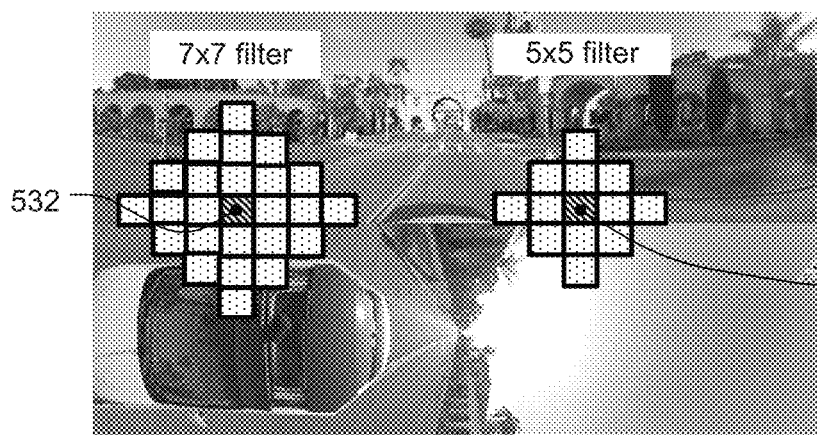
FIG. 5C illustrates an example of ALF process using a 5×5 or 7×7 filter for a reconstructed VR360 picture.
Figure 6:
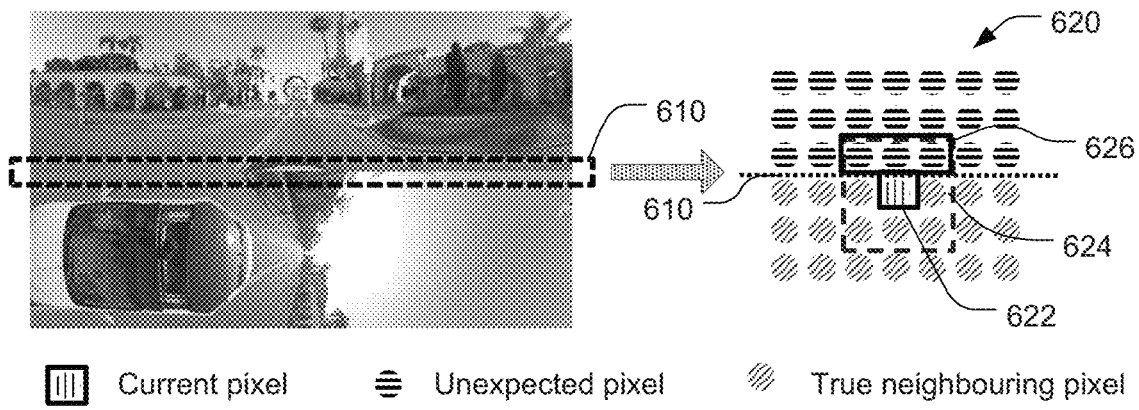
FIG. 6 illustrates an example of SAO filter applied to a reconstructed pixel at the discontinuous edge.

The following description is of the best-contemplated mode of carrying out the invention. This description is made for the purpose of illustrating the general principles of the invention and should not be taken in a limiting sense. The scope of the invention is best determined by reference to the appended claims.

It will be readily understood that the components of the present invention, as generally described and illustrated in the figures herein, may be arranged and designed in a wide variety of different configurations. Thus, the following more detailed description of the embodiments of the systems and methods of the present invention, as represented in the figures, is not intended to limit the scope of the invention, as claimed, but is merely representative of selected embodiments of the invention.

Reference throughout this specification to "one embodiment," "an embodiment," or similar language means that a particular feature, structure, or characteristic described in connection with the embodiment may be included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. One skilled in the relevant art will recognize, however, that the invention can be practiced without one or more of the specific details, or with other methods, components, etc. In other instances, well-known structures, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of apparatus and methods that are consistent with the invention as claimed herein.

In the description like reference numbers appearing in the drawings and description designate corresponding or like elements among the different views.

As mentioned before, when an in-loop filter is applied to a discontinuous boundary in VR360 videos, the filtering process for a reconstructed pixel on one side of the discontinuous boundary may need to use one or more reconstructed pixels on the other side of the discontinuous boundary (referred as unexpected pixels). Due to the discontinuity between the pixels on two sides of the discontinuous boundary, use of the unexpected pixels for the in-loop filtering processing may cause noticeable artefacts. Therefore, according to a method of the present invention, the in-loop filtering process is disabled or a smaller size filter is used if the in-loop filtering process is across the discontinuous boundary. The discontinuous boundary or edge in VR360 video or PIP is also referred as virtual boundary in this disclosure. The in-loop filter may be referred as loop filter in this disclosure. The in-loop filtering process may be referred as loop filtering process in this disclosure.

Figure 7A:
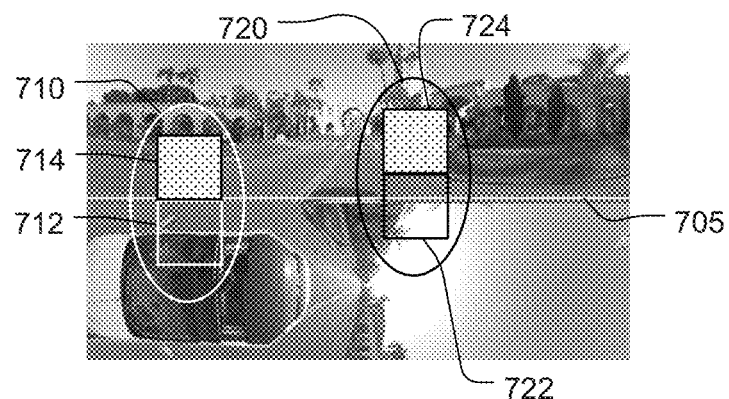
FIG. 7A illustrates examples of de-blocking filtering process being applied across the discontinuous boundary or applied to a block boundary close to the discontinuous boundary.

FIG. 7A illustrates de-blocking filtering process being applied across the discontinuous boundary 705. In FIG. 7A, the de-blocking filtering process 710 is applied to a current block 712, where the block boundary is aligned with the discontinuous boundary 705. The de-blocking filtering process for the current block 712 involves unexpected pixels as indicated by the dots-filled area 714. Since the de-blocking filtering process is applied across the discontinuous boundary, the method according to the present invention disables the de-blocking filtering process for the current block. The de-blocking filtering process 720 is applied to a current block 722, where the discontinuous boundary 705 is located inside the current block. The de-blocking filtering process for the current block 722 may involve unexpected pixels, where some of pixels in the current block may be on a different side of the virtual boundary from the neighbouring reference block as indicated by the dots-filled area 724. A method according to the present invention disables the de-blocking filtering process for the current block or uses a de-blocking filter with a smaller filter size. In addition, when the virtual boundary is located inside a neighbouring reference block, a method according to the present invention disables the de-blocking filtering process for the current block or uses a de-blocking filter with a smaller filter size. In the HEVC, the de-blocking filter may use up to 4 pixels on each side of the block boundary. According to embodiments of the present invention, the de-blocking filter may use less pixels on at least one side of the block boundary.

The de-blocking filter may be applied to a block such as the transform block boundary, sub-block boundary or other types of block. Accordingly, in one embodiment, the loop filtering process is disabled for a block (e.g. a sub-block or a transform block) if the block (e.g. a sub-block edge or a transform block edge associated with the sub-block or the transform block for the de-blocking filter) is aligned with the virtual boundary or the virtual boundary is located inside the block or neighbouring block.

Figure 7B:
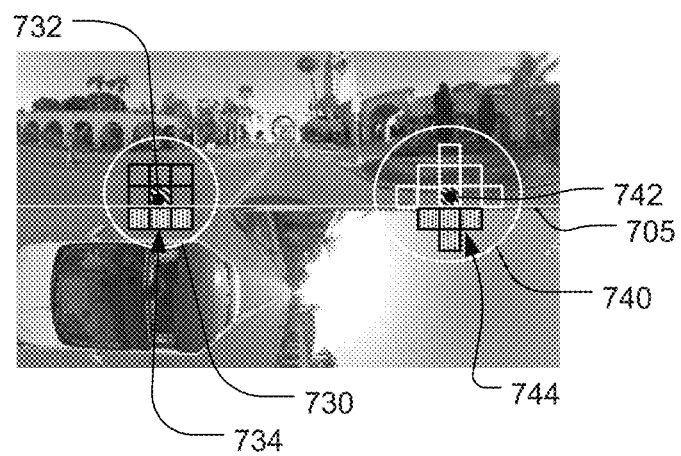
FIG. 7B illustrates examples of SAO (Sample Adaptive Offset) and ALF (Adaptive Loop Filter) filtering processes being applied across the discontinuous boundary.

In FIG. 7B, the SAO filtering process 730 is applied to a current pixel 732 adjacent to the discontinuous boundary 705. The SAO filtering process for the current pixel 732 involves unexpected pixels as indicated by the dots-filled squares 734. Since the SAO filtering process is applied across the discontinuous boundary, the method according to the present invention disables the SAO filtering process for the current pixel. In FIG. 7B, the ALF filtering process 740 is applied to a current pixel 742 adjacent to the discontinuous boundary 705. The ALF filtering process for the current pixel 742 involves unexpected pixels as indicated by the dots-filled squares 744. Since the ALF filtering process is applied across the discontinuous boundary, the method according to the present invention disables the ALF filtering process for the current pixel. While, de-blocking, SAO and ALF in-loop filters are used as examples for the method of disabling in-loop filtering process across the discontinuous boundary, the method may also be applied to other types of in-loop filtering process.

When the loop filter is applied to a reconstructed pixel, the loop filtering process involves a set of reference pixels around the reconstructed pixel being filtered. For a selected loop filter, the set of reference pixels involved is referred as a filtered unit. For example, for the de-blocking filter, the filtered unit corresponds to 4-pixel lines on each side of the block edge. For SAO, the filtered unit depends on the EO direction. For the 0° directional pattern, the filtered unit corresponds to 3×1 pixels. For the 90° directional pattern, the filtered unit corresponds to 1×3 pixels. For the 135° and 45° directional patterns, the filtered unit corresponds to 3×3 pixels. For ALF, the filtered unit corresponds to 5×5 or 7×7 pixels.

Figure 8:
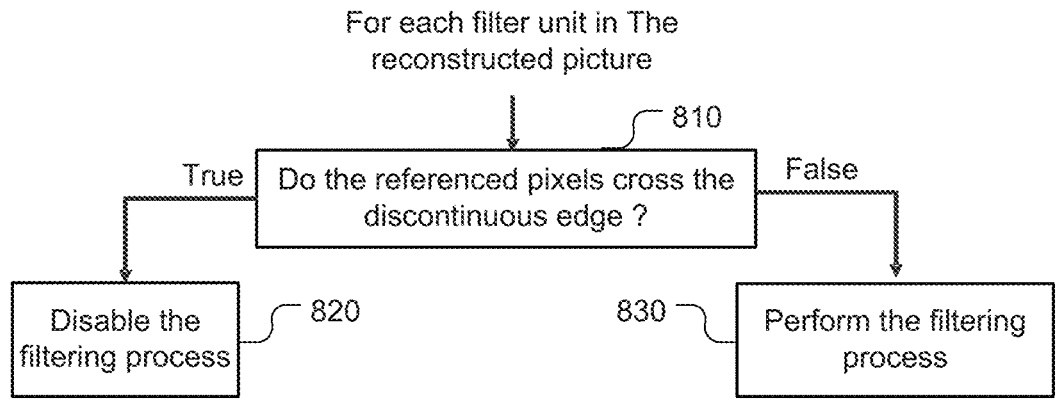
FIG. 8 illustrates an example of flowchart for the modified filtering process according to an embodiment of the present invention for the fixed filter size.

The conventional filtering process can be modified to support the method of the present invention. When the filter size is fixed (e.g. the de-blocking filter in HEVC with filter size fixed at 4 pixels at each side of a block edge), the filtering process can be modified as shown in FIG. 8. In FIG. 8, whether the reference pixels involved for the in-loop filtering process cross the discontinuous edge is checked in step 810. If the result is True (i.e., the reference pixels involved for the in-loop filtering process cross the discontinuous edge), the filtering process of the current filtered unit is disabled as shown in step 820. If the result is False (i.e., the reference pixels involved for the in-loop filtering process do not cross the discontinuous edge), the filtering process of the current filtered unit is performed as shown in step 830.

Figure 9:
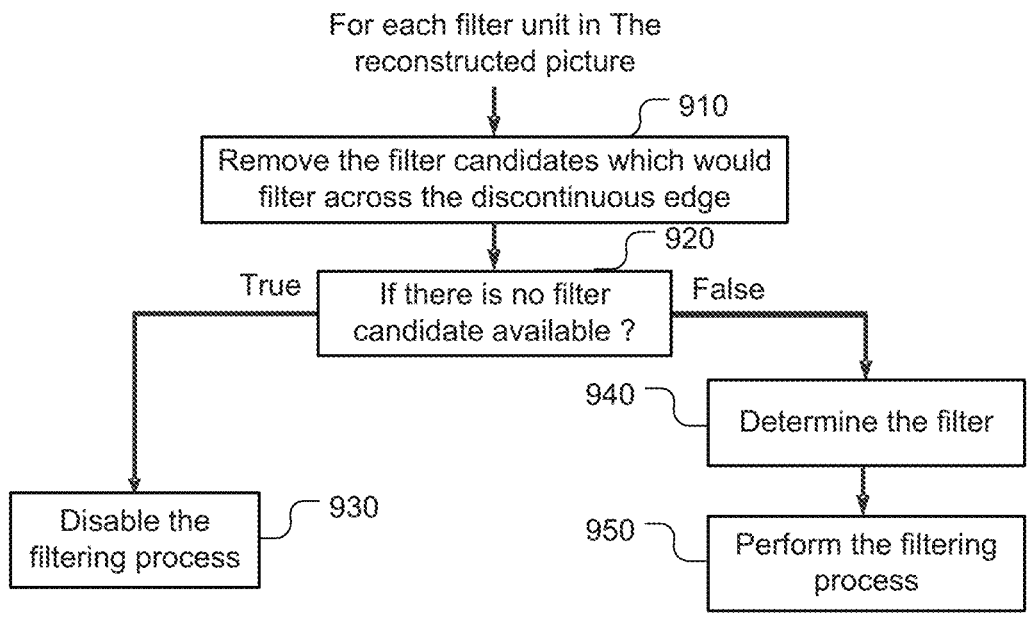
FIG. 9 illustrates an example of flowchart for the modified filtering process according to an embodiment of the present invention for the adaptive filter size.

When the filter size is adaptive (e.g. ALF with filter size of 7×7 or 5×5), the filtering process can be modified as shown in FIG. 9. In FIG. 9, any filter candidate that involves pixels across the discontinuous edge is removed as shown in step 910. After removal, the filtering process is disabled if there is no filter candidate available. Otherwise, a filter is selected from the available candidates and the filter selected is used to perform the filtering process and a syntax is transmitted in a bitstream to indicate the selected filter. Accordingly, whether there is no candidate available is checked in step 920. If the result is True (i.e., no filter candidate available), the filtering process is disabled as shown in step 930. If the result is False (i.e., at least one filter candidate available), a filter is determined in step 940 and the filtering process is performed based on the selected filter as shown in step 950. A syntax can be transmitted in the bitstream in PPS (Picture Parameter Set), APS (Adaptation Parameter Set), SPS (Sequence Parameter Set), slice, picture, CTU, CU, PU or TU level to indicate the selected filter from the available candidate set.

Figure 10:
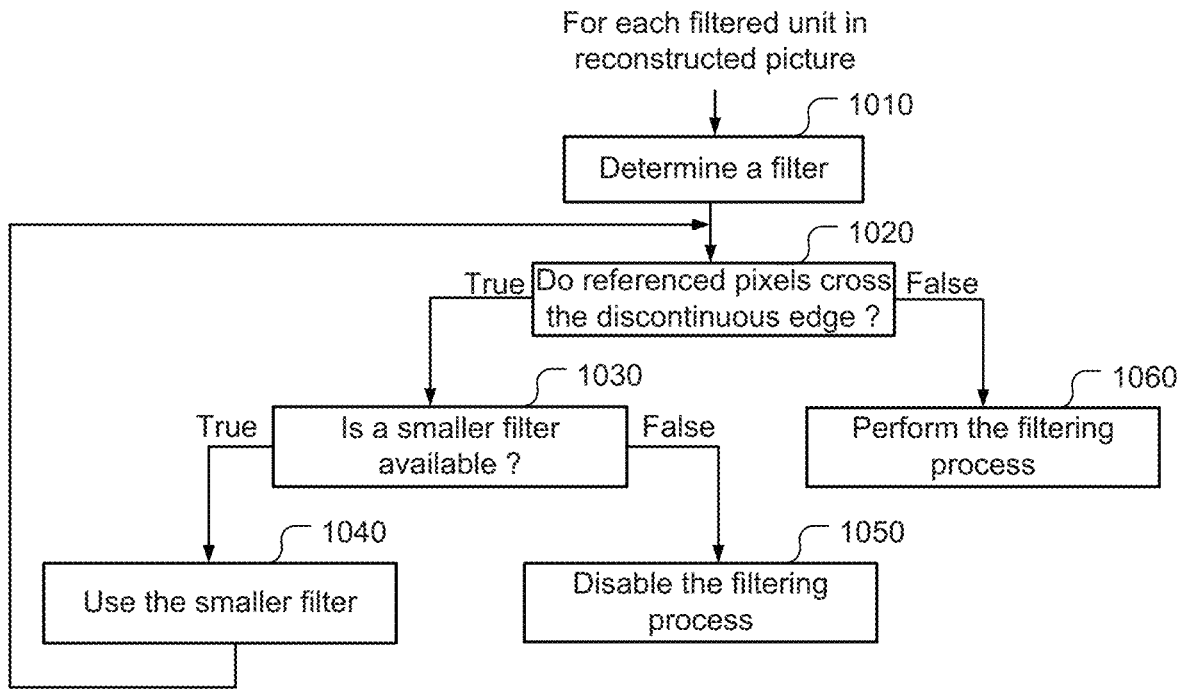
FIG. 10 illustrates an example of flowchart for the modified filtering process according to another embodiment of the present invention for the adaptive filter size.

FIG. 10 illustrates an alternative method to the method shown in FIG. 9 for filtering process disabling. In this scheme, it firstly determines a filter from the filter candidates as shown in step 1010. Whether the referenced pixels cross the discontinuous edge is performed in step 1020. If the result of step 1020 is True, it further checks whether a smaller filter is available in step 1030. A smaller filter can be a filter candidate that is less than and closest to the current filter size. If a smaller filter is available (i.e., the "True" path from step 1030), the smaller filter is used as shown in step 1040. If there is no smaller filter can be used, the filtering process is disabled as shown in step 1050. If the result of step 1020 is False, the filtering process is performed in step 1060.

For the modified filtering process, whether the referenced pixels cross the discontinuous edge needs to be checked. The checking operation has to be performed for each filtered unit, which may lead to a large computational overhead. Accordingly, a technique to speed up the checking process is disclosed herein.

Figure 11:
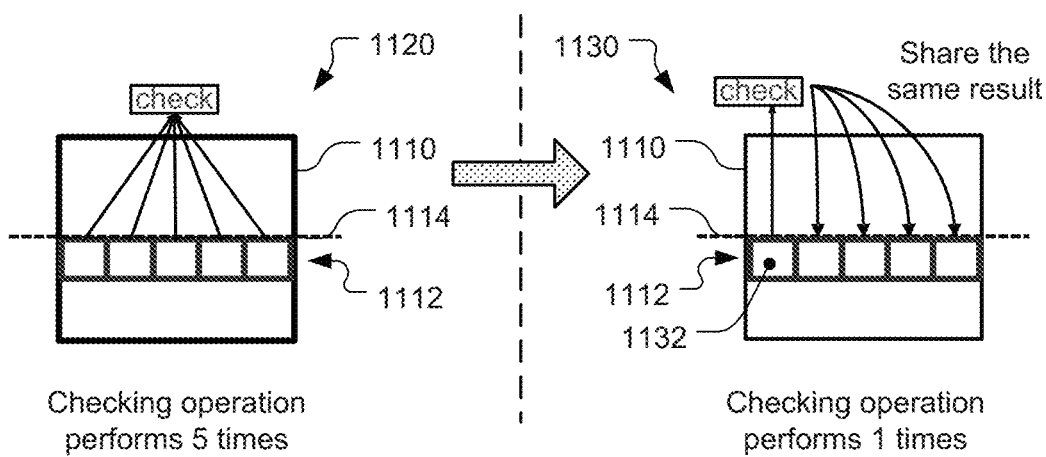
FIG. 11 illustrates an example of the speed-up technique for the boundary checking process.

In the 3×2 layout of cubemap based projection, the discontinuous edge is always located at position (x, PicHeight/2), where x is within the range of [0, PicWidth] and PicHeight and PicWidth represent the picture height and width respectively. Thus, the filtered pixels with the same y position can share the same checking results so that the computational complexity can be significant reduced. FIG. 11 illustrates an example of the speed-up technique for the boundary checking process. On the left side, a conventional checking process 1120 is used for a VR360 picture 1110 in the 3×2 layout, where the discontinuous edge 1114 between the top sub-frame and the bottom sub-frame is shown. A row of filtered units 1112 (i.e., 5 filtered units in this example) adjacent to the discontinuous edge 1114 is shown. According to the conventional checking process, all 5 filtered units have to be checked. On the right side, a checking process 1130 incorporating the present invention is shown. They position of first filtered unit 1132 in the row of filtered units 1112 is checked and the result is used by other filtered units in the row.

In order to indicate disabling the filters for virtual boundaries, a syntax (e.g. enable flag) can be signalled in the bitstream at the SPS, PPS, APS, slice, tile, picture, CTU, CU, PU or TU level to indicate whether the filters are disabled for virtual boundaries in the corresponding region (e.g. picture, slice, tile, CTU, CU, TU or PU). For example, a syntax sps_loop_filter_disabled_across_virtual_boundaries_flag for disabling loop filter across the virtual boundary can be signalled in SPS.

The virtual boundaries can be different in different pictures, slices, tiles, CTUs, CUs, PUs or TUs.

In the above disclosure, various loop filtering processes according to embodiments have been disclosed based on the 3×2 layout from cubemap mapping. However, the present invention is not limited to this specific VR360 picture format. The loop filtering process of the present invention may applied to VR360 pictures in other layout formats, such as the layout formats derived from OctaHedron Projection (OHP), icosahedron projection (ISP), Segmented Sphere Projection (SSP) and Rotated Sphere Projection (RSP). There may be more than one virtual boundaries in the VR360 pictures. Furthermore, the virtual boundaries may be in other directions instead of vertical/horizontal.

As mentioned before, the discontinuous edge within a picture may also occur for non-VR360 pictures. For example, in Picture-In-Picture video, the pictures also include discontinuous edges within the picture. The loop filtering process of the present invention can also be applied to the PIP video. Again, the discontinuous boundary or edge in PIP is an example of virtual boundary.

This method is not only applicable to the de-blocking filter, ALF and SAO filters but also applicable to other types of in-loop filter.

Figure 12:
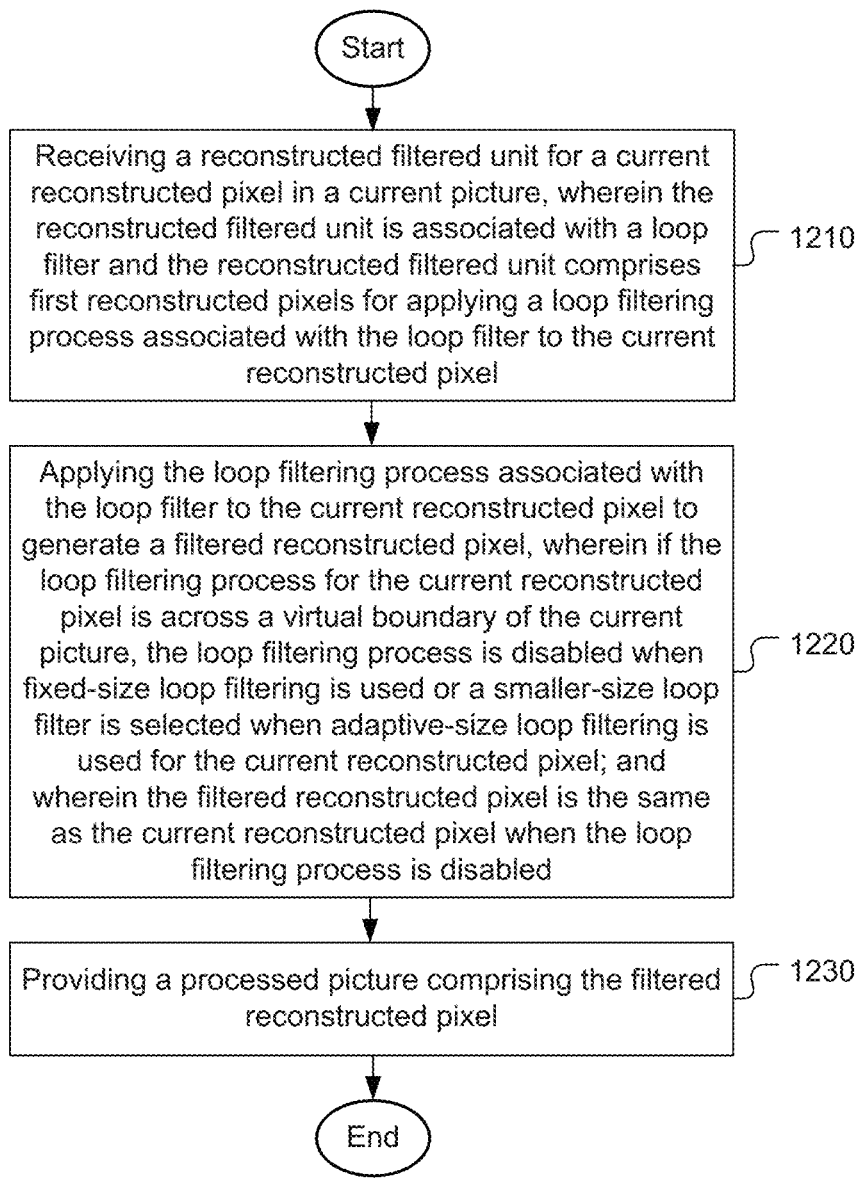
FIG. 12 illustrates an exemplary flowchart of a coding system for VR360 video according to an embodiment of the present invention, where the loop filtering process is disabled if the loop filtering process is across a virtual boundary.

FIG. 12 illustrates an exemplary flowchart of a coding system for VR360 video according to an embodiment of the present invention, where the loop filtering process is disabled if the loop filtering process is across a virtual boundary. The steps shown in the flowchart, as well as other following flowcharts in this disclosure, may be implemented as program codes executable on one or more processors (e.g., one or more CPUs) at the encoder side and/or the decoder side. The steps shown in the flowchart may also be implemented based hardware such as one or more electronic devices or processors arranged to perform the steps in the flowchart. According to this method, a reconstructed filtered unit for a current reconstructed pixel in a VR360 picture is received in step 1210, wherein the reconstructed filtered unit is associated with a loop filter and the reconstructed filtered unit comprises first reconstructed pixels for applying a loop filtering process associated with the loop filter to the current reconstructed pixel. The loop filtering process associated with the loop filter is applied to the current reconstructed pixel to generate a filtered reconstructed pixel in step 1220, wherein if the loop filtering process for the current reconstructed pixel is across a virtual boundary of the VR360 picture, the loop filtering process is disabled when fixed-size loop filtering is used or a smaller-size loop filter is selected when adaptive-size loop filtering is used for the current reconstructed pixel; and wherein the filtered reconstructed pixel is the same as the current reconstructed pixel when the loop filtering process is disabled. A processed VR360 picture comprising the filtered reconstructed pixel is provided in step 1230.

The flowchart shown above is intended for serving as examples to illustrate embodiments of the present invention. A person skilled in the art may practice the present invention by modifying individual steps, splitting or combining steps with departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more electronic circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of coding a video sequence, wherein pictures from the video sequence include one or more discontinuous edges, the method comprising:
receiving a reconstructed filtered unit for a current reconstructed pixel in a current picture comprising a 360-degree view, wherein the reconstructed filtered unit is associated with a loop filter and the reconstructed filtered unit comprises first reconstructed pixels for applying a loop filtering process associated with the loop filter to the current reconstructed pixel;
applying the loop filtering process associated with the loop filter to the current reconstructed pixel to generate a filtered reconstructed pixel, wherein the loop filter corresponds to a de-blocking filter and the loop filtering process is disabled for a target block based on a block edge associated with the target block for the de-blocking filter being aligned with the virtual boundary and the block edge is a transform block boundary, the target block comprising plural pixels, wherein when the loop filtering process for the current reconstructed pixel is across a virtual boundary of the current picture, the loop filtering process is disabled for the transform block boundary, wherein the filtered reconstructed pixel is the same as the current reconstructed pixel when the loop filtering process is disabled; and
providing a processed picture comprising the filtered reconstructed pixel, wherein the video sequence is a 360-degree virtual reality (VR360) video sequence, and the picture is projected onto plural faces of a cube.

2. The method of claim 1, wherein the video sequence corresponds to a 360-degree virtual reality (VR360) video.

3. The method of claim 1, wherein the loop filter belongs to a group comprising de-blocking filter, SAO (Sample Adaptive Offset) and ALF (Adaptive Loop Filter).

4. The method of claim 1, wherein the loop filter corresponds to a de-blocking filter and the loop filtering process is disabled for the target block if the virtual boundary crosses through the target block, the target block comprising a transform block.

5. The method of claim 1, wherein the loop filter corresponds to a de-blocking filter and the loop filtering process is disabled for the target block if the virtual boundary cross a neighbouring block of the target block, and wherein the loop filtering process is applied to a block boundary between the target block and the neighbouring block of the target block.

6. The method of claim 1, wherein when the loop filter uses adaptive filter size, any loop filter candidate across the virtual boundary is removed and the loop filtering process is disabled if no remaining loop filter candidate is available.

7. The method of claim 1, further comprising, when the loop filter uses adaptive filter size and the loop filtering process is applied to the current reconstructed pixel, determining a selected filter and transmitting a syntax in a bitstream to indicate the selected filter.

8. The method of claim 1, wherein when the loop filter uses adaptive filter size, a loop filter candidate is determined and whether the loop filtering process associated with the loop filter candidate is across the virtual boundary is checked; if the loop filtering process associated with the loop filter candidate is across the virtual boundary, whether a smaller loop filter candidate exists is checked; and if no smaller loop filter candidate is available, the loop filtering process is disabled.

9. The method of claim 8, wherein if the smaller loop filter candidate exists, the smaller loop filter candidate is used as the loop filter candidate and whether the loop filtering process associated with the loop filter candidate is across the virtual boundary is checked.

10. The method of claim 1, wherein when the current picture is in a 3×2 layout of cubemap-based projection, results of boundary checking derived for a target filtered unit in a row of filtered units are shared by other filtered units in the row of filtered units, and wherein the boundary checking determines whether the loop filtering process for the target filtered unit is across the virtual boundary between a top sub-frame and a bottom sub-frame of the current picture.

11. An apparatus for coding a video sequence, wherein pictures from the video sequence include one or more discontinuous edges, the apparatus comprising one or more electronic devices or processors configured to:
receive a reconstructed filtered unit for a current reconstructed pixel in a current picture comprising a 360-degree view, wherein the reconstructed filtered unit is associated with a loop filter and the reconstructed filtered unit comprises first reconstructed pixels for applying a loop filtering process associated with the loop filter to the current reconstructed pixel;
apply the loop filtering process associated with the loop filter to the current reconstructed pixel to generate a filtered reconstructed pixel, wherein the loop filter corresponds to a de-blocking filter and the loop filtering process is disabled for a target block based on a block edge associated with the target block for the de-blocking filter being aligned with the virtual boundary and the block edge is a transform block boundary, the target block comprising plural pixels, wherein when the loop filtering process for the current reconstructed pixel is across a virtual boundary of the current picture, the loop filtering process is disabled for the transform block boundary, wherein the filtered reconstructed pixel is the same as the current reconstructed pixel when the loop filtering process is disabled; and provide a processed picture comprising the filtered reconstructed pixel, wherein the video sequence is a 360-degree virtual reality (VR360) video sequence, and the picture is projected onto plural faces of a cube.

* * * * *